No. 727,289. PATENTED MAY 5, 1903.
F. CHARRON & L. GIRARDOT.
SHAFT CONNECTING GEAR FOR MOTOR ROAD VEHICLES.
APPLICATION FILED MAR. 3, 1903.
NO MODEL. 2 SHEETS—SHEET 1.
FIG. I.
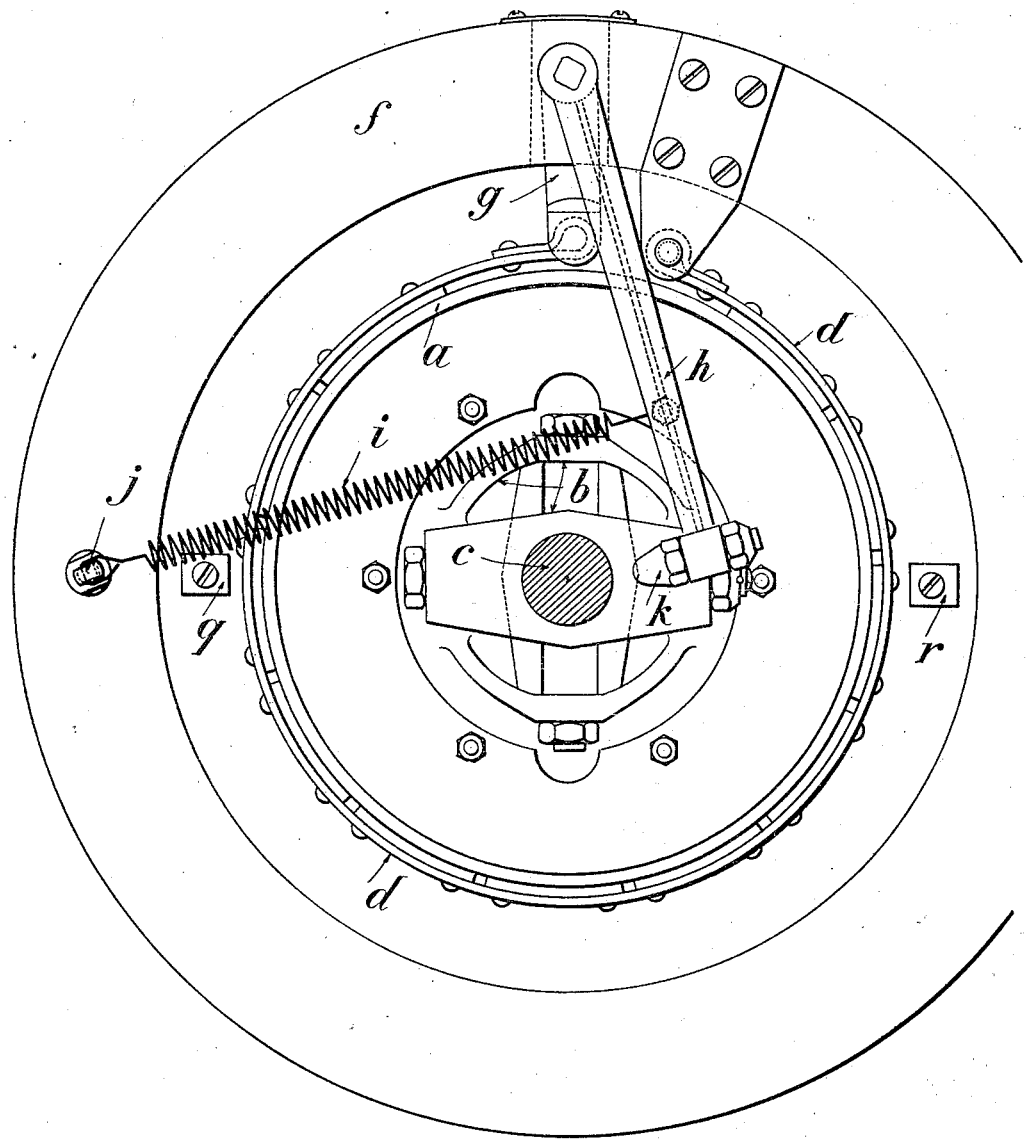

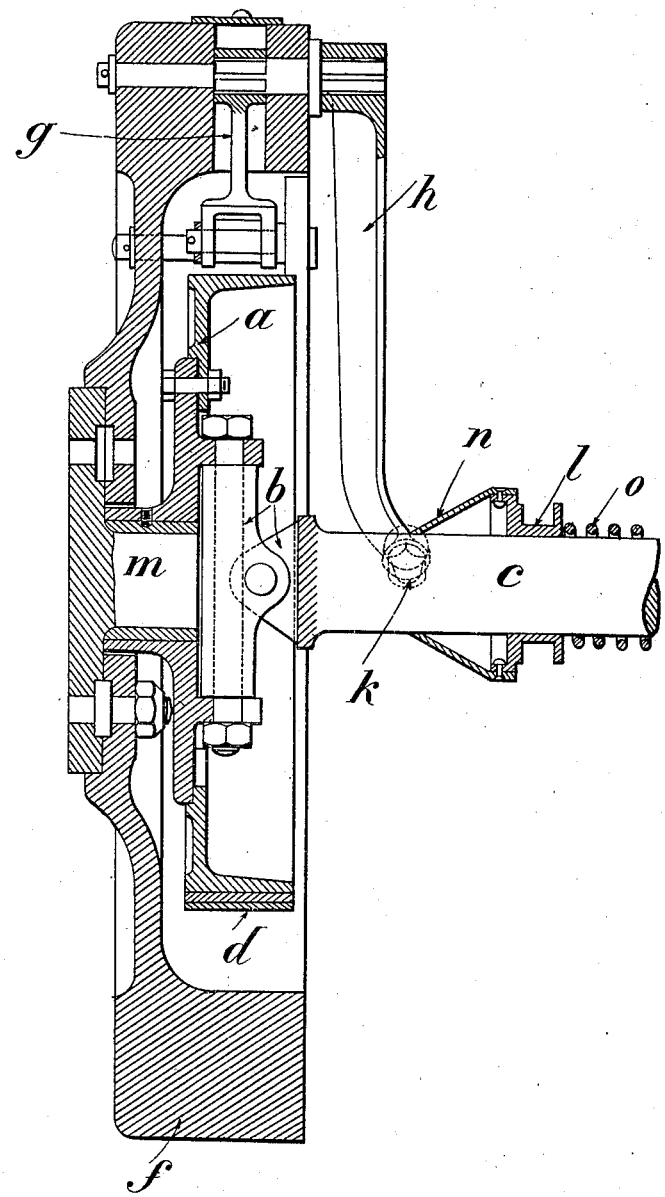

No. 727,289. Patented May 5, 1903.

UNITED STATES PATENT OFFICE.

FERDINAND CHARRON AND LÉONCE GIRARDOT, OF PUTEAUX, FRANCE.

SHAFT-CONNECTING GEAR FOR MOTOR ROAD-VEHICLES.

SPECIFICATION forming part of Letters Patent No. 727,289, dated May 5, 1903.

Application filed March 3, 1903. Serial No. 145,971. (No model.)

*To all whom it may concern:*

Be it known that we, FERDINAND CHARRON and LÉONCE GIRARDOT, citizens of the Republic of France, and residents of 7 Rue Ampère, Puteaux, Seine, in the Republic of France, have invented certain new and useful Improvements in Shaft-Connecting Gear for Motor Road-Vehicles, of which the following is a specification.

This invention relates to new or improved means for connecting the motor-shafts of motor road-vehicles to the driven shafts or shafts of the driven wheels, the said shafts being in line with each other.

The invention has the advantage of reducing to a minimum the inertia of the parts carried by the driven shaft and of requiring a very weak spring to automatically secure the coupling, thus obviating longitudinal stress on the shaft by which the rapid wear of the bearings is caused.

In the accompanying drawings, Figure 1 is a front view of the connecting-gear seen from the position of the driven shaft, and Fig. 2 a longitudinal cross-section of the coupling-gears.

The connecting-gear essentially comprises a hollow cylindrical pulley $a$, mounted loosely on the end of the motor-shaft $m$ and connected to the driven shaft $c$ by a Cardan joint $b$. This pulley is surrounded by a metal strap or band $d$, one end of which is fastened to the fly-wheel $f$, keyed on the motor-shaft, and the other end to the arm $g$ of a bent lever pivoted to the said fly-wheel. The longer arm $h$ of the said lever is subject to the continuous pull of a spring $i$, attached to the fly-wheel at $j$, so that the rounded end of a finger $k$ on the lever-arm $h$ tends to remain in continuous frictional contact with the shaft $c$, and consequently to move apart the ends of the band $d$.

A hollow truncated cone $n$ is fixed to a grooved sleeve $l$, adapted to slide on the shaft $c$, and when this cone is pushed to the left, as seen in Fig. 2, it passes under the finger $k$ of the lever-arm $h$ and rotates the bell-crank lever $h\,g$ about its pivot, thus moving the movable end of the band $d$ toward the fixed end of the said band and tightening the latter on the pulley. The pulley and the shaft $c$ will thereupon be driven. The movement of the sleeve $l$ toward the left is automatically effected by a helical metal spring $o$, placed on shaft $c$ between the said sleeve and a fixed abutment on the said shaft. Even with a comparatively weak spring the coupling is instantaneous by reason of the arrangement of the levers and the large friction-surfaces of the band $d$ on the pulley $a$.

The device described tends to remain permanently coupled. For disconnecting the driving-gear a foot-lever or the like is operated in the usual manner and moves the sleeve $l$ toward the right, Fig. 2, by means of a train of levers. During this movement of the sleeve $l$ the lever $g\,h$, actuated by the spring $i$, pivots in the opposite direction to that of its first movement, so that the finger $k$ slides toward the end of the cone $n$, and the two ends of the band $d$ move apart. By this means the said band is disconnected from the pulley. When disconnected or open, the band $d$ bears against two abutments $q$ and $r$ on the fly-wheel. By this means the oscillation of the said band during traveling, as well as the eventual driving of pulley $a$, is prevented.

Having now described our invention, what we claim as new, and desire to secure by Letters Patent, is—

1. A connecting-gear for the shafts of motor-cars and the like, comprising a pulley $a$ connected to the shaft $c$ to be driven, in combination with a metal band or strap $d$ externally surrounding the said pulley, a fly-wheel $f$ keyed to the motor-shaft $m$, means for fixing one end of the said strap $d$ to the fly-wheel, a bell-crank lever $g\,h$ pivoted on the fly-wheel and having its shorter arm connected with the free end of the strap $d$, a finger $k$ fixed to the end of the longer arm $h$ of the said bell-crank lever, a cone $n$ adapted to slide on the shaft $c$ to be driven, a spring $o$ bearing on the said cone, a sleeve $l$ adapted to move the said cone in the opposite direction to that in which it is pressed by the spring $o$, a spring $i$ attached by one end to the longer arm $h$ of the bell-crank lever $g\,h$ and by the other end to the fly-wheel $f$, and tending to press the finger $k$ against the cone $n$, substantially as and for the purpose set forth.

2. A shaft-connecting gear for motor-cars, comprising a pulley $a$ connected to the shaft $c$ to be driven, in combination with a metal band or strap $d$ externally surrounding the said pulley, a fly-wheel $f$ keyed to the motor-shaft $m$, means for fixing one end of the strap $d$ to the fly-wheel, a bell-crank lever $g\,h$ pivoted on the fly-wheel, and having its shorter arm connected to the free end of the strap $d$, a finger $k$ fixed to the end of the longer arm $h$ of the bell-crank lever, a cone $n$ adapted to slide on the shaft $c$ to be driven, a spring $o$ bearing on the said cone $n$, a sleeve $l$ adapted to move the said cone in the opposite direction to that in which the spring $o$ bears, a spring $i$ attached to the longer arm of the lever $g\,h$ and to the fly-wheel, and two abutments $q$ and $r$ fixed to the fly-wheel at points diametrically opposite each other and outside of band $d$, substantially as and for the purpose set forth.

In witness whereof we have hereunto set our hands in the presence of two witnesses.

FERDINAND CHARRON.
LÉONCE GIRARDOT.

Witnesses:
ANTOINE LAVOIX,
J. ALLISON BOWEN.